United States Patent
Hartmann et al.

(10) Patent No.: US 7,499,788 B2
(45) Date of Patent: Mar. 3, 2009

(54) METHOD AND DEVICE FOR OPERATING AN INTERNAL COMBUSTION ENGINE HAVING A PLURALITY OF CYLINDER BANKS

(75) Inventors: Dirk Hartmann, Stuttgart (DE);
Werner Mezger, Eberstadt (DE);
Kristina Milos, Leonberg (DE);
Andreas Roth, Muehlacker-Lomersheim (DE); Juergen Rappold, Ilsfeld-Auenstein (DE); Georg Mallebrein, Korntal-Muenchingen (DE);
Nikolas Poertner, Stuttgart (DE); Henri Barbier, Schwieberdingen (DE); Ingo Fecht, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/975,461

(22) Filed: Oct. 19, 2007

(65) Prior Publication Data

US 2008/0120012 A1   May 22, 2008

(30) Foreign Application Priority Data

Nov. 16, 2006   (DE) ................. 10 2006 054 182

(51) Int. Cl.
*F02D 41/00* (2006.01)
*F02D 45/00* (2006.01)

(52) U.S. Cl. .................. 701/103; 123/198 F

(58) Field of Classification Search ......... 701/103–105, 701/102; 123/198 F, 481, 436, 478
See application file for complete search history.

(56) References Cited

U.S. PATENT DOCUMENTS

| 4,393,825 | A | * | 7/1983 | Breeck et al. ............ 123/198 F |
| 4,625,123 | A | * | 11/1986 | Gillett et al. ............... 290/40 B |
| 7,246,594 | B2 | * | 7/2007 | Hartmann ................. 123/198 F |

FOREIGN PATENT DOCUMENTS

DE   10 2005 036 441   8/2007

* cited by examiner

*Primary Examiner*—Hieu T Vo
(74) *Attorney, Agent, or Firm*—Kenyon & Kenyon LLP

(57) ABSTRACT

A method and a device for operating an internal combustion engine having a plurality of cylinder banks which allow a simple diagnosis of a faulty deactivation of the gas exchange of at least one cylinder bank, or a simple determination of the ambient pressure. In the process, in addition to at least one first cylinder bank having activated gas exchange of at least one cylinder, a deactivation of the gas exchange of all cylinders of at least one second cylinder bank is initiated in at least one operating state of the internal combustion engine. The at least one second cylinder bank is assigned a separate intake tract. In the at least one operating state, a variable that is characteristic for the pressure in the intake tract of the at least one second cylinder bank is measured and evaluated for the presence of undesired pressure pulsations.

8 Claims, 3 Drawing Sheets

US 7,499,788 B2

METHOD AND DEVICE FOR OPERATING AN INTERNAL COMBUSTION ENGINE HAVING A PLURALITY OF CYLINDER BANKS

FIELD OF THE INVENTION

The present invention is based on a method and a device for operating an internal combustion engine having a plurality of cylinder banks.

BACKGROUND INFORMATION

German Patent Application No. 10 2005 036 441 (which is not pre-published) refers to a method and a device for operating an internal combustion engine having two cylinder banks, in which, in addition to a first cylinder bank having activated gas exchange of all cylinders, a deactivation of the gas exchange of all cylinders of a second cylinder bank is initiated in at least one operating state of the internal combustion engines, the first and the second cylinder bank each being assigned a separate intake tract.

SUMMARY OF THE INVENTION

In contrast, the method according to the present invention and the device for operating an internal combustion engine according to the present invention, having the features of the independent claims, have the advantage over the related art that, in addition to at least one first cylinder bank having activated gas exchange of at least one cylinder, a deactivation of the gas exchange of all cylinders of at least one second cylinder bank is initiated in at least one operating state of the internal combustion engine, the at least one second cylinder bank being assigned a separate intake tract, and that a variable that is characteristic for a pressure in the intake tract of at least one second cylinder bank is measured in the at least one operating state and evaluated for the presence of undesired pressure pulsations. For one, this allows a diagnosis of the at least one second cylinder bank with regard to a successful deactivation of the gas exchange of all cylinders of the at least one second cylinder bank and, in the case of a fault-free deactivation of the gas exchange of all cylinders of the at least one second cylinder bank, makes it possible to draw conclusions with regard to the instantaneously prevailing ambient pressure in an especially simple manner independently of the opening degree of a throttle valve. No separate sensor for measuring the ambient pressure is required for this purpose.

The measures set forth in the dependent claims make possible advantageous further developments and improvements of the method indicated in the main claim.

It is especially advantageous that a fault is inferred in the deactivation of the gas exchange if undesired pressure pulsations are present. An error in the deactivation of the gas exchange is able to be detected very easily in this manner and with a minimum of effort. The detection of the presence of pressure pulsations alone is already sufficient to infer a fault in the deactivation of the gas exchange.

Another advantage results from the fact that, if undesired pressure pulsations having an amplitude above a predefined value fail to occur, the pressure derived from the measured characteristic variable is interpreted as measure for the ambient pressure. If the deactivation of the gas exchange is not faulty, the ambient pressure may be determined in an especially uncomplicated manner in this way and independently of the position of a throttle valve and also without the required use of a separate sensor. It then corresponds to the pressure derived from the measured value for the characteristic variable. This applies in particular to the case where the intake tract of the at least one second cylinder bank has no connection to the intake tract of a cylinder bank in which the gas exchange of at least one cylinder is activated.

Alternatively, however, the ambient pressure may be ascertained by additionally considering a pressure drop across a shared intake tract that branches into the at least one first intake tract and the at least one second intake tract. In this manner the ambient pressure is able to be determined even when using such a shared intake tract, from the variable characteristic for the pressure in the intake tract of the at least one second cylinder bank, without a separate sensor being required for the ambient pressure.

In the case of an air filter in the shared intake tract, the pressure drop across the shared intake tract may be taken into account in a particularly uncomplicated manner in that the pressure drop across the air filter in the shared intake tract is taken into consideration when determining the ambient pressure.

This pressure drop above the shared intake tract, in particular above the air filter in the shared intake tract, is ascertainable in an especially simple manner and at low expense with the aid of, for example, a characteristics map applied on a test stand as a function of load and rotational speed of the internal combustion engine.

Furthermore, it is advantageous if the measured variable characteristic for the pressure in the intake tract of the at least one second cylinder bank is sampled in a crankshaft-synchronous manner. This allows an identification of the faulty cylinder.

An exemplary embodiment of the present invention is represented in the drawings and explained in greater detail in the following description.

DETAILED DESCRIPTION

Figure 1:
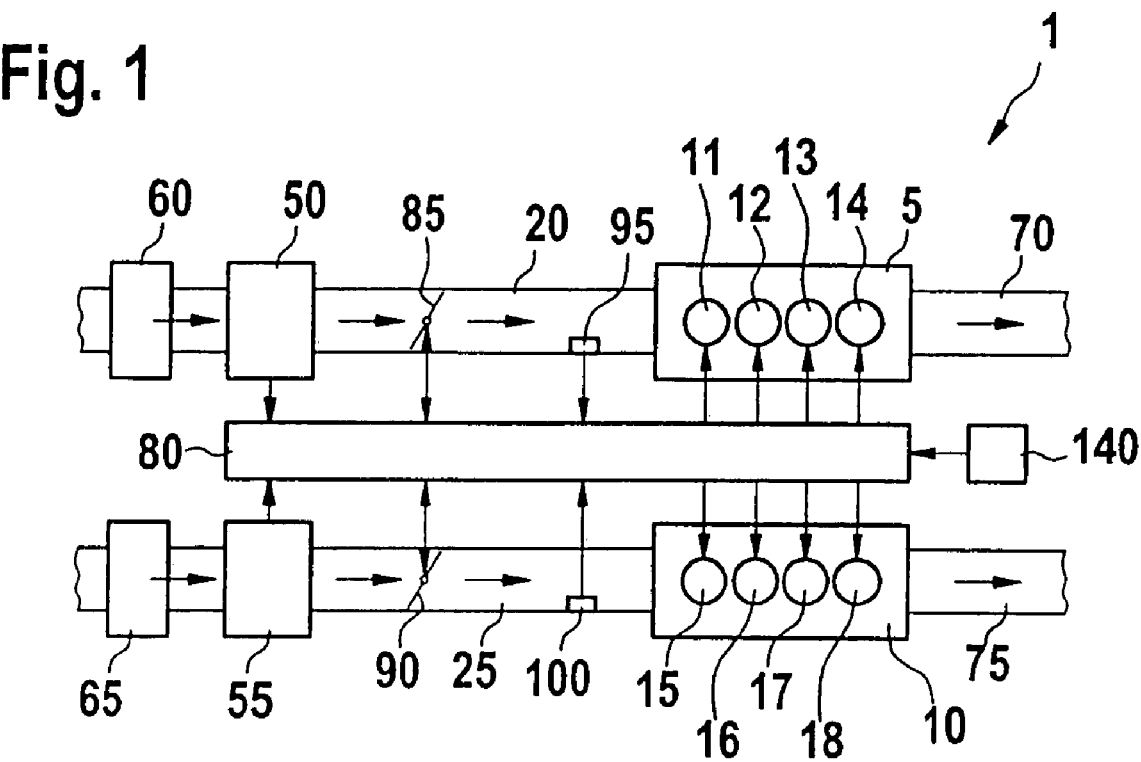
FIG. 1 shows a first block diagram of an internal combustion engine having completely separate intake tracts for different cylinder banks.

In FIG. 1, 1 designates an internal combustion engine, which drives a vehicle, for example. Internal combustion engine 1 may take the form of an Otto engine or a diesel engine, for instance. In the following text, it is assumed by way of example that internal combustion engine 1 is designed as an Otto engine. Internal combustion engine 1 includes a first cylinder bank 5 having a first cylinder 11, a second cylinder 12, a third cylinder 13, and a fourth cylinder 14. Furthermore, internal combustion engine 1 includes a second cylinder bank 10 having a fifth cylinder 15, a sixth cylinder 16, a seventh cylinder 17, and an eighth cylinder 18. As an alternative, the number of cylinders per cylinder bank may also be selected greater or smaller than four. It is likewise possible, alternatively, to provide a different number of cylinders for different cylinder banks. Internal combustion engine 1 may optionally also include more than the two illustrated cylinder banks 5, 10. However, in the following text the exemplary embodiment and/or the exemplary methods of the present invention will be described exemplarily on the basis of the internal combustion engine shown in FIG. 1, which includes the two cylinder banks 5, 10 having four cylinders each. Cylinders 11, 12, 13, 14 of first cylinder bank 5 are supplied with fresh air via a first intake tract 20. The flow direction of the fresh air in first intake tract 20 is indicated by arrows. First intake tract 20 includes a first throttle valve 85, which is controlled by an engine controller 80.

The control is implemented in the manner known to one skilled in the art, for instance in order to realize a driver wish specified as a function of the actuation degree of a driving pedal. Situated in first intake tract 20, downstream from throttle valve 85, is a first intake-manifold pressure sensor 95, which measures the pressure downstream from first throttle valve 85 and forwards the measuring result to engine controller 80. In addition or as an alternative to first intake-manifold pressure sensor 95, a first air-mass flow sensor 50 is disposed upstream from first throttle valve 85, which may be designed as, for example, hot-film air mass meter or ultrasonic air mass meter and measures the mass air flow, forwarding the measuring result to engine controller 80. Situated upstream from first air-mass flow sensor 50 in first intake tract 20 is an optional first air filter 60.

Cylinders 15, 16, 17, 18 of second cylinder bank 10 are supplied with fresh air via a second intake tract 25. Second intake tract 25 includes a second throttle valve 90, which is likewise controlled by engine controller 80 in the manner known to one skilled in the art, for instance in order to adjust an opening degree as a function of the actuation of a driving pedal, which is not shown in FIG. 1. Disposed downstream from second throttle valve 90 in second intake tract 25 is a second intake-manifold pressure sensor 100, which measures the pressure downstream from second throttle valve 90 in second intake tract 25 and transmits the measuring result to engine controller 80. In addition or as an alternative to second intake-manifold pressure sensor 100, a second air-mass meter 55 is disposed upstream from throttle valve 90, for instance in the form of a hot-film or ultrasonic air-mass meter, which measures the air mass flow and conveys the measuring result to engine controller 80. Upstream from second air-mass meter 55, an optional second air filter 65 may be situated in second intake tract 25.

Furthermore, engine controller 80 controls cylinders 11, 12, ..., 18 of the two cylinder banks 5, 10 with regard to fuel injection and ignition angle in the manner known to one skilled in the art, for instance in order to obtain a desired air/fuel mixture ratio and a desired efficiency for the combustion. The exhaust gases generated during the combustion of the air/fuel mixture in first cylinder bank 5 are expelled into a first exhaust-gas tract 70, and the exhaust gases generated in second cylinder bank 10 during the combustion of the air-fuel mixture are expelled into a second exhaust-gas tract 75. The flow direction of the exhaust gas in the two exhaust-gas branches 70, 75 is also indicated in FIG. 1, by arrows in each case. The two exhaust-gas tracts 70, 75 may be completely separate from one another or they may discharge into a shared exhaust-gas tract, which is not shown in FIG. 1, however.

The gas or charge exchange of the individual cylinders 11, 12, 13, ..., 18 constitutes the conversion of the fresh air, supplied to these cylinders via intake tracts 20, 25, into the exhaust gas expelled by the cylinders into exhaust-gas tracts 70, 75. This gas exchange is controlled by the opening and closing of the intake and discharge valves of the particular cylinder 11, 12, ..., 18. Cylinders 11, 12, ..., 18 may include one intake valve or a plurality of intake valves and one discharge valve or a plurality of discharge valves in each case. The closing and opening of the intake and the discharge valves is implemented in a manner known to one skilled in the art with the aid of one or a plurality of camshaft(s). To deactivate the gas exchange, all intake and discharge valves of one bank are provided with, for example, a device by which the frictional connection between camshaft and intake and discharge valve is able to be interrupted. This device may be actuated electrically or hydraulically.

As an alternative, the closing and the opening of the intake and discharge valves may also be performed by electrohydraulic or electromagnetic valve control in the manner known to one skilled in the art. The opening and closing instants for the intake and discharge valves of the individual cylinders are able to be individually specified and set at random by the electrohydraulic or electromagnetic valve control. For instance, it is known in this context to operate internal combustion engine 1 in a first operating state, the so-called full-engine operating mode, in which the gas exchange for all cylinders 11, 12, ..., 18 of the two cylinder banks 5, 10 is activated, i.e., in which at least one intake valve and at least one discharge valve of the cylinders 11, 12, ..., 18 is triggered twice per working cycle for the opening and closing so as to enable a gas exchange through the corresponding cylinder. In a second operating state, however, the so-called half-engine operating state, the gas exchange for half of the cylinders is deactivated by deactivating, i.e., permanently closing, all intake valves and all discharge valves for each of these cylinders, in order to prevent a gas exchange. For example, it may be provided in this context that cylinders 11, 12, 13, 14 of first cylinder bank 5 all remain activated with regard to the gas exchange, but cylinders 15, 16, 17, 18 of second cylinder bank 10 will all be deactivated with regard to the gas exchange. Of course, as an alternative, it is conversely also possible for all cylinders 15, 16, 17, 18 of second cylinder bank 10 to remain activated with regard to the gas exchange and all cylinders 11, 12, 13, 14 of first cylinder bank 5 to be deactivated with regard to the gas exchange.

It is essential for the exemplary embodiment and/or the exemplary methods of the present invention that there be at least one operating state of internal combustion engine 1 in which the gas exchange of at least one cylinder of one cylinder bank or a plurality of cylinder banks is activated, but the gas exchange of all cylinders of one cylinder bank or a plurality of other cylinder banks is deactivated at the same time. In the present example according to FIG. 1, it is to be assumed that the gas exchange of at least one of cylinders 11, 12, 13, 14 of first cylinder bank 5 is activated, while the gas exchange of all cylinders 15, 16, 17, 18 of second cylinder bank 10 is deactivated, i.e., permanently suspended, at the same time.

Furthermore, the present requires that at least one of the cylinder banks whose cylinders are all deactivated with regard to the gas exchange, have a separate intake tract assigned, which—in the ideal case, but not necessarily—has no connection to an intake tract of a cylinder bank in which at least one cylinder is activated with regard to the gas exchange. This ideal case is illustrated in FIG. 1 where second cylinder bank 10 is assigned its own intake tract in the form of second intake tract 25, which has no connection to first intake tract 20.

Figure 2:
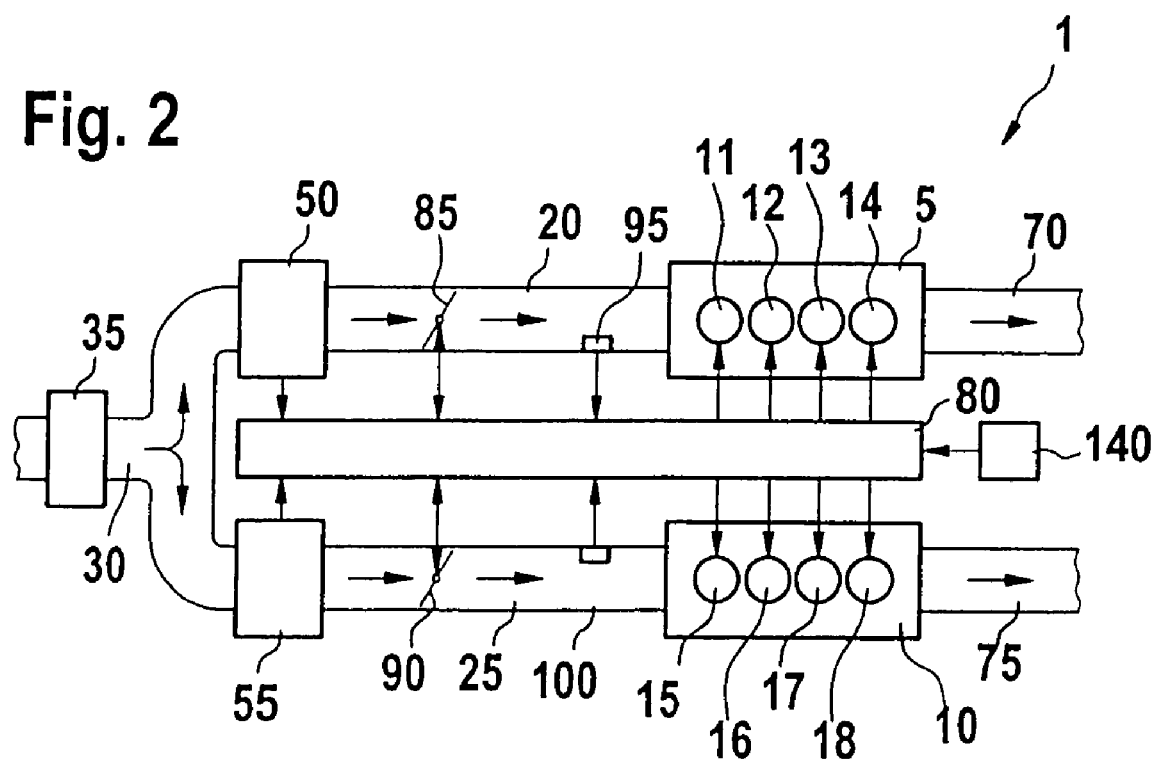
FIG. 2 shows a second block diagram of an internal combustion engine having a shared intake tract, which branches into separate intake tracts for individual cylinder banks.

However, as an alternative and as shown in FIG. 2, it is also possible to provide a shared intake tract 30, which discharges into first intake tract 20 assigned to first cylinder bank 5 and into second intake tract 25 assigned to second cylinder bank 10. In FIG. 2 the same reference numerals designate the same elements as in FIG. 1. The configuration of internal combustion engine 1 in FIG. 2 is identical to the configuration of the internal combustion engine in FIG. 1, with the sole exception that no separate air filter is provided for each intake tract 20, 25, but a shared air filter 35 is situated in shared intake tract 30.

In addition, in the same way as in FIG. 1, first air-mass meter 50 and/or first intake-manifold pressure sensor 95 and also first throttle valve 85 are disposed in first intake tract 20 in FIG. 2, and second air-mass meter 55 and/or second intake-manifold pressure sensor 100 as well as second throttle valve 90 are disposed in second intake tract 25.

Figure 3:
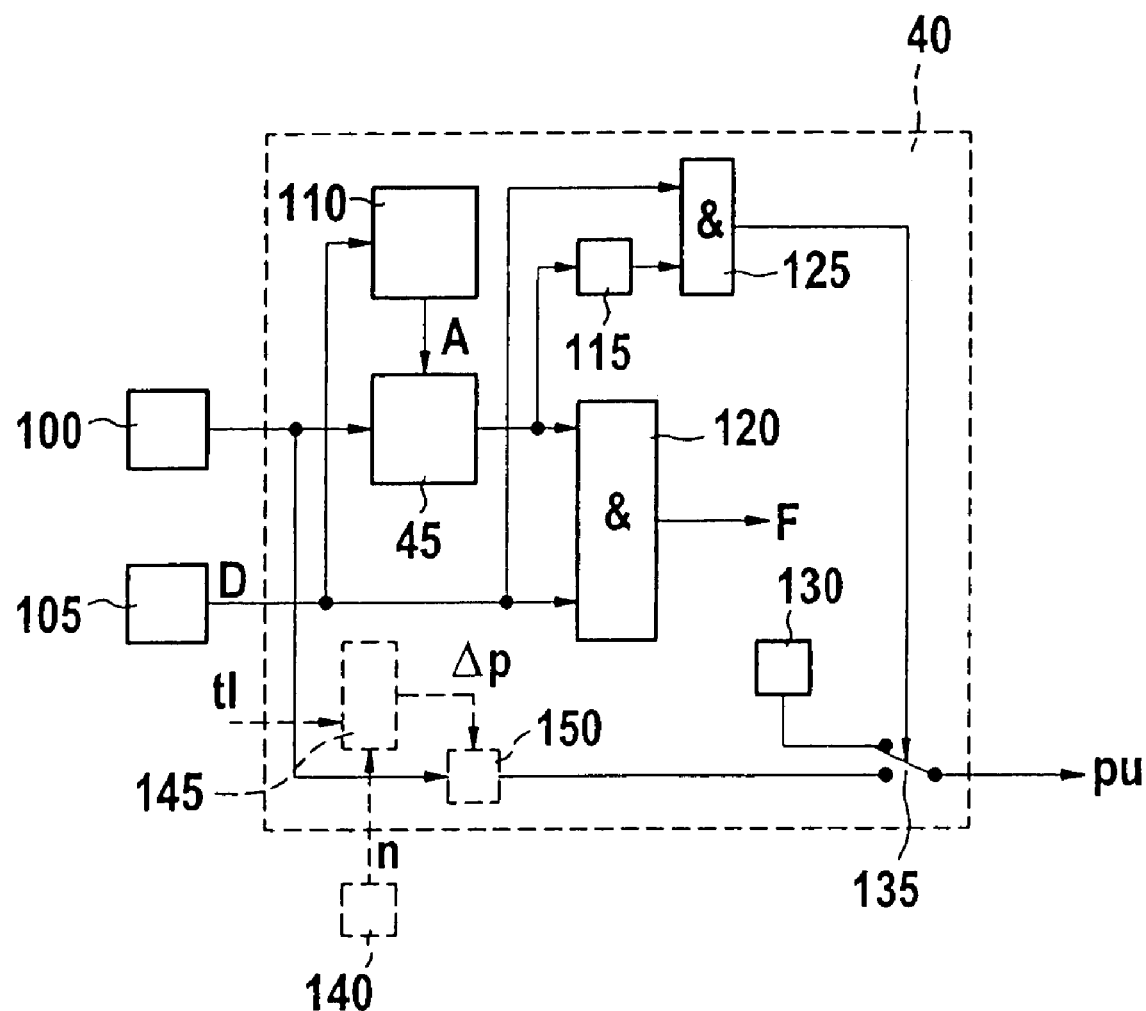
FIG. 3 shows a flow chart to elucidate the device of the present invention and the method of the present invention.

FIG. 3 shows a flow chart of a device according to the present invention as it may be implemented in engine controller 80, for instance, in the form of software and/or hardware. Second intake-manifold pressure sensor 100 supplies device 40 with the measuring signal for the pressure downstream from second throttle valve in second intake track 25. This signal is conveyed to an evaluation unit 45 of device 40. As an alternative, evaluation unit 45 may additionally also be supplied with the air-mass measuring signal of second air-mass meter 55. In evaluation unit 45 this signal is then converted into the corresponding pressure in second intake tract 25 downstream from second throttle valve 90 in the manner known to one skilled in the art as a function of additional operating variables of internal combustion engine 1, such as the engine speed and the opening angle of second throttle valve 90. In the following text, however, it is to be assumed by way of example that the pressure signal to be evaluated in evaluation unit 45 is received in evaluation unit 45 directly from second intake-manifold pressure sensor 100.

The engine speed is determined with the aid of an engine-speed sensor 140 in the manner known to one skilled in the art, the measuring signal of engine-speed sensor 140 likewise being supplied to engine controller 80 as shown in FIGS. 1 and 2. The position of first throttle valve 85 and the position of second throttle valve 90 may be measured using, for instance, an individual throttle valve potentiometer, in the manner known to one skilled in the art, and likewise supplied to engine controller 80. That is to say, if evaluation unit 45 evaluates the signal from second air-mass meter 55 instead of the signal from second intake-manifold pressure sensor 100, then evaluation unit 45 must also be supplied with the signal of engine-speed sensor 140 and the signal of the throttle-valve potentiometer of second throttle valve 90 in order to determine the pressure signal in evaluation unit 45.

Additionally conveyed to evaluation unit 45 is the signal from a deactivation unit 105, which is located in engine controller 80, for example, and outside of device 40, and which initiates a switchover from full-engine operation to half-engine operation and thus a deactivation of the gas exchange of all cylinders 15, 16, 17, 18 of second cylinder bank 10 once an operating state is reached that allows the half-engine operation, this switchover being implemented in the manner known to one skilled in the art. This deactivation is initiated by, for instance, a set deactivation signal D of deactivation unit 105, which is also transmitted to device 40. As an alternative, deactivation unit 105 may also be disposed inside device 40. Deactivation signal D is also transmitted to an activation element 110 of device 40. Activation element 110 is connected to evaluation unit 45 and conveys an activation signal A to evaluation unit 45. If activation signal A is set, then the evaluation unit is induced to evaluate the pressure signal in the manner described below; otherwise, the evaluation of the pressure signal is blocked by a reset activation signal A by activation unit 110. As soon as activation element 110 receives a positive flank of deactivation signal D by which the deactivation of the gas exchange of cylinders 15, 16, 17, 18 of second cylinder bank 10 is also initiated in a manner not shown, activation element 110 starts a timer, which sets the previously reset activation signal A once a specified response time since receipt of the positive flank of deactivation signal D has elapsed, and thereby initiates the evaluation of the pressure signal by evaluation unit 45.

The specified response time may be applied on a test stand, for example in such a way that oscillations of the pressure signal resulting from the deactivation of the gas exchange of cylinders 15, 16, 17, 18 of second cylinder bank 10 are unable to be evaluated by control unit 45. To this end, the specified response time may be applied in such a way, for example, that the time since deactivation of the gas exchange of cylinders 15, 16, 17, 18 of second cylinder bank 10 until decay of the oscillations of the pressure signals caused thereby is smaller or—in the ideal case—equal to, the specified response time. The smaller the selected specified response time, the earlier the diagnosis of the deactivation of the gas exchange of cylinders 15, 16, 17, 18 of second cylinder bank 10 may take place and possibly a measurement of the ambient pressure.

As soon as the gas exchange of at least one of cylinders 15, 16, 17, 18 of second cylinder bank 10 is to be reactivated again, for instance because an operating state has been reached in which internal combustion engine 1 is to be operated in full-engine operation again, deactivation signal D is reset and activation signal A thereby as well, so that the further evaluation of the pressure signal is blocked. In the half-engine operating state, evaluation unit 45 checks the pressure signal with regard to the presence of undesired pressure pulsations. An undesired pressure pulsation is detected by evaluation unit 45 by, for example, its amplitude exceeding a specified value.

To this end, the specified value for the amplitude may be suitably applied on a test stand in such a way that, for one, the value is smaller than the amplitude of the pressure pulsations that result in an incorrectly not deactivated gas exchange of one cylinder or a plurality of cylinders of second cylinder bank 10, and, for another, the value is greater than the amplitude of pressure pulsations that result due to fluctuations in the ambient pressure whose amplitude is usually lower than the amplitude of the pressure pulsations resulting from an incorrectly not deactivated gas exchange of one cylinder or a plurality of cylinders of second cylinder bank 10.

In the case of the exemplary embodiment according to FIG. 2, the specified value for the amplitude of the pressure pulsations may also be selected such that it is greater than the amplitude of pressure interferences that result from the coupling of second intake tract 25 to first intake tract 20, but whose amplitude still lies below the amplitude of the pressure pulsations that come about in the case of the incorrectly not deactivated gas exchange of one cylinder or a plurality of cylinders of the second cylinder bank.

In this manner pressure pulsations caused by an incorrectly not deactivated gas exchange of one cylinder or a plurality of cylinders of second cylinder bank 10 are able to be unambiguously distinguished from fluctuations in the ambient pressure or from other pressure interferences that are not caused by an incorrectly not deactivated gas exchange of one cylinder or a plurality of cylinders of second cylinder bank 10.

In the event that evaluation unit 45 detects pressure pulsations having an amplitude above the specified value, it outputs at its output a setting signal, which is forwarded to a first AND gate 120. In addition, first AND gate 120 receives deactivation signal D from deactivation unit 105. Output signal F of first AND gate 120 is set when the two input signals of first AND gate 120 are set; otherwise, output signal F of first AND gate 120 is reset.

As a result, signal F at the output of first AND gate 120 is set only if both the gas exchange of the four cylinders 15, 16, 17, 18 of second cylinder bank 10 is to be deactivated and evaluation unit 45 additionally detected pressure pulsations in second intake tract 25 whose amplitudes lie above the specified value. In this case an incorrectly not deactivated gas exchange of one cylinder or a plurality of cylinders of second cylinder bank 10 is inferred and a corresponding item of information is reproduced by set fault signal F, for instance on an instrument cluster of the vehicle, and a further half-engine operating state is blocked for this driving cycle. Furthermore, the output signal of evaluation unit 45 is conveyed to an inversion element 115 whose output signal is set if the output signal of evaluation unit 45 is reset, and whose output signal is reset if the output signal of evaluation unit 45 is set. The output signal of inversion element 115 is transmitted to a second AND gate 125, to which deactivation signal D is supplied as well. Thus, the output signal of second AND gate 125 is set only if the output signal of evaluation unit 45 is reset and deactivation signal D is set. The output signal of second AND gate 125 is therefore set only if evaluation unit 45 does not detect any pressure pulsations having an amplitude that is greater than the specified value and the gas exchange of cylinders 15, 16, 17, 18 of second cylinder bank 10 is to be deactivated at the same time. Otherwise, the output signal of second AND gate 125 is reset.

As a result, the output signal of second AND gate 125 is set only if evaluation unit 45 did not detect an incorrectly not implemented deactivation of a gas exchange of one cylinder or a plurality of cylinders of second cylinder bank 10. Given a set output signal of second AND gate 125, a controlled switch 135 is triggered so as to connect the output of second intake-manifold pressure sensor 100 to an ambient-pressure output pu of device 40, so that the pressure signal determined by second intake-manifold sensor 100 is output as ambient pressure signal by device 40. Otherwise, i.e., if the output signal of second AND-gate 125 is reset, controlled switch 135 is induced to connect ambient-pressure output pu to an ambient-pressure determination unit 130, which modulates the ambient pressure in the conventional manner and only in a suitable operating state of internal combustion engine 1 using operating variables of internal combustion engine 1, in a manner known to one skilled in the art.

As an alternative, if the output signal of second AND-gate 125 is not set, controlled switch 135 may also be induced to connect the ambient-pressure output to a zero-value memory, which emits the zero value for ambient pressure pu, so that it is detected at ambient-pressure output pu that no valid value was able to be determined for ambient pressure pu.

In the case of the exemplary embodiment according to FIG. 1, if the output signal of second AND-gate 125 is set, it is possible, as described in FIG. 3, to use the output signal of second intake-manifold pressure sensor 100 directly as ambient-pressure signal pu, since the pressure in second intake tract 25 corresponds to ambient pressure pu in this case. This is so because no gas exchange is taking place in second cylinder block 10. However, in the case of the second exemplary embodiment according to FIG. 2, if the output signal of second AND-element 125 is set and the ambient pressure is determined on the basis of the pressure in second intake tract 25, the pressure drop in shared intake tract 30, caused by the active gas exchange in first cylinder block 5, must be considered as well. This pressure drop in shared intake tract 30 may arise across shared air filter 35, for instance.

In the process, the pressure drop across shared air filter 35 may be determined with the aid of a characteristics map, for example, applied on a test stand as a function of the engine load and the engine speed. To this end, an optional characteristics map 145, which is shown by a dashed line in FIG. 3, is provided in device 40, to which engine speed sensor 140 supplies engine speed n on the one hand, and engine load t1 on the other. The engine load may be indicated by engine controller 80 in a manner known to one skilled in the art, as combustion chamber charge or injection quantity. As a function of the two input variables, characteristics map 145 supplies at its output pressure drop $\Delta p$ across shared air filter 35, which is added to the output signal of second intake-manifold pressure sensor 100 by a summing element 150 in order to form ambient-pressure signal pu at the output of summing element 150, ambient pressure signal pu arriving at the ambient-pressure output of device 40 via controlled switch 135 if the output signal of second AND-gate 125 is set.

Figure 4:
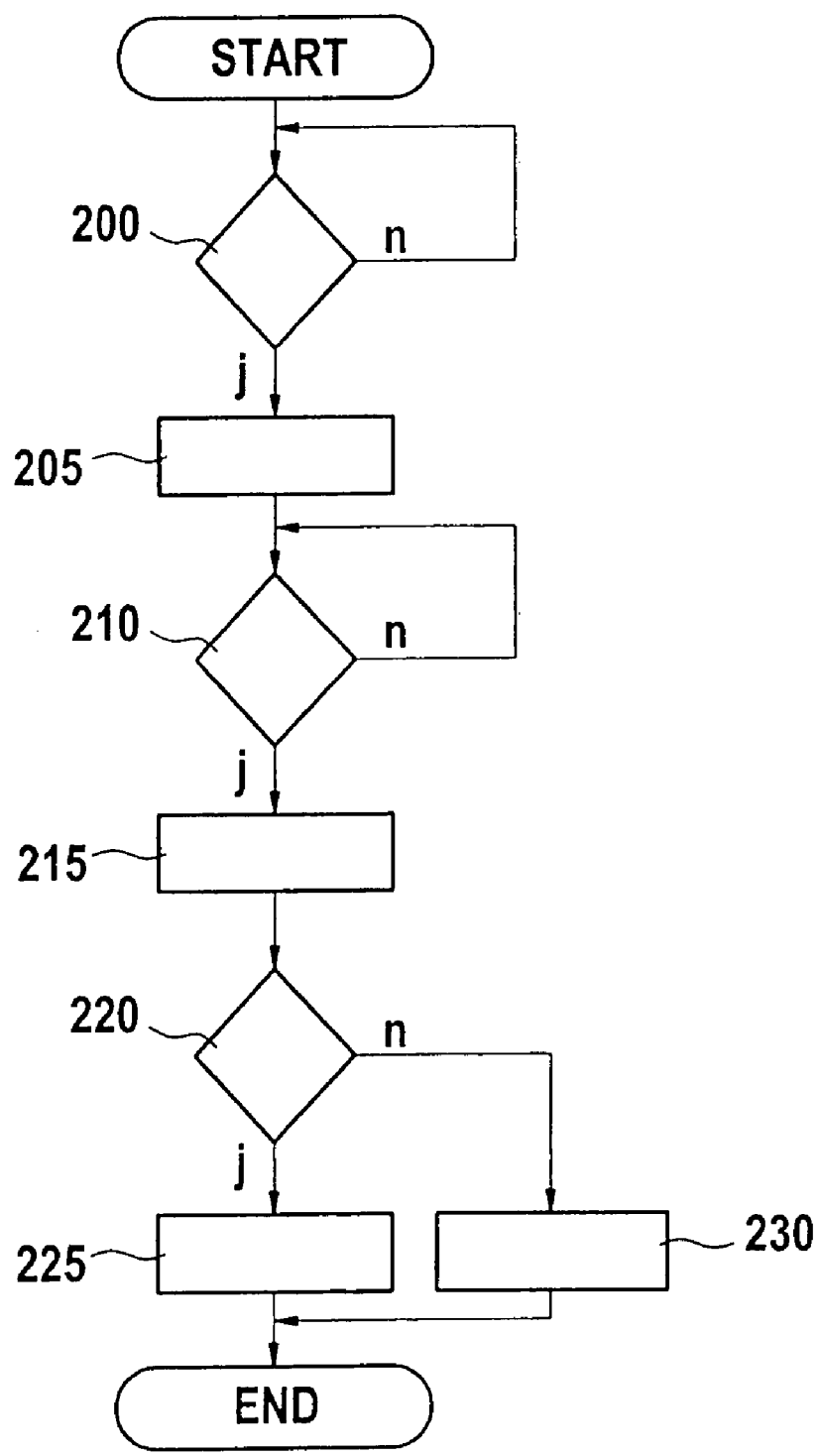
FIG. 4 shows a flow chart for an exemplary sequence of the method of the present invention.

FIG. 4 shows a flow chart for an exemplary sequence of the method according to the present invention. Once the program has started, it is checked in activation element 110 in a program point 200 whether deactivation signal D is set. If this is the case, branching to a program point 205 takes place; otherwise, there is a return to program point 200.

In program point 205, activation element 110 starts the timer. Branching to a program point 210 then takes place.

In program point 210, the timer of activation element 110 checks whether the specified response time has elapsed. If this is the case, branching to a program point 215 takes place; otherwise, there will be a return to program point 210.

In program point 215, activation element 110 sets activation signal A and thereby initiates the evaluation of the pressure signal that was received from second intake-manifold pressure sensor 100 in evaluation unit 45, the evaluation being carried out by evaluation unit 45. Branching to a program point 220 then occurs.

In program point 220, evaluation unit 45 checks whether pressure pulsations having an amplitude above the specified value are detected in the pressure signal. If this is the case, branching to a program point 225 takes place; otherwise, branching to program point 230 occurs.

In program point 225, the output signal of evaluation unit 45 is set, so that, if deactivation signal D is set, fault signal F will be set and the output signal of second AND-gate 125 will be reset. In so doing, an item of information, for example, is displayed on an instrument cluster of the vehicle by set fault signal F in the manner described, a half-engine operating state optionally being prohibited for the instantaneous driving cycle.

Then the program is left.

In program point 230, the output signal of second AND-gate 125 is set, and ambient-pressure signal pu emitted by device 40 is derived from the signal of second intake-manifold pressure sensor 100 in the manner described. Then the program is left.

If the pressure signal of second air-mass meter 55 is ascertained, then it may be emitted as ambient-pressure signal only after conversion into the pressure signal in the known manner in the case of specific embodiment according to FIG. 1, or after correction by the pressure drop in shared intake tract 30 according to the specific embodiment of FIG. 2. In this case, the signal emitted by second air-mass meter 55 must therefore be converted into the described pressure signal in the manner described, prior to its conveyance to controlled switch 135 in the first specific embodiment according to FIG. 1, or prior to its conveyance to summing element 150 in the second specific embodiment according to FIG. 2.

Using the ambient pressure determined in the manner described, the altitude above sea level of the internal combustion engine is able to be determined in the manner known to one skilled in the art.

If all cylinders of a cylinder bank are deactivated for the gas exchange, no further air flow is taking place in the intake tract assigned to this cylinder bank. In the present example, no further air flow is thus taking place in second intake tract 25 once the gas exchange of all cylinders 15, 16, 17, 18 of second cylinder bank 10 has been deactivated.

An incorrectly not deactivated gas exchange of one cylinder or a plurality of cylinders of second cylinder bank 10 may arise in that, notwithstanding initiation of the deactivation of the gas exchange of all cylinders 15, 16, 17, 18 of second cylinder bank 10, an intake valve as well as a discharge valve continue to be active and are thus not permanently closed for at least one of cylinders 15, 16, 17, 18 of second cylinder bank 10, so that a gas exchange continues to take place by the assigned cylinder. The particular of the two valves of the affected cylinder that must be deactivated and thus permanently closed for the deactivation of the gas exchange, is activated in a faulty manner and thus has remained open at least once per working cycle.

Pressure pulsations whose amplitude lie above the specified value therefore constitute undesired pressure pulsations, which are attributable to an error in the deactivation of the gas exchange of one cylinder or a plurality of cylinders of second cylinder bank 10.

Given suitable crankshaft-synchronous sampling of the pressure pulsations on the deactivated cylinder bank, and taking into account the ignition sequence and a cylinder counter, it is possible to infer the faulty cylinder.

If first air-mass meter 50 and/or, in particular, second air-mass meter 55 are/is not required for the described pressure measurement, but the pressure measurement is instead carried out by first intake-manifold pressure sensor 95 or second intake-manifold pressure sensor 100, then a shared air-mass meter may optionally be situated in shared intake tract 30 downstream from shared air filter 35, according to the specific embodiment of FIG. 2. However, shared intake tract 30 must branch into first intake tract 20 and second intake tract 25 upstream from throttle valves 85, 90, since both intake tracts 20, 25 would otherwise form a shared intake manifold, which would falsify the described evaluation of the pressure signal with regard to the pressure pulsations in an undesired manner.

What is claimed is:

1. A device for operating an internal combustion engine having a plurality of cylinder banks, comprising:
   a controlling arrangement to control a deactivation of a gas exchange of all cylinders of at least one second cylinder bank in at least one operating state of the internal combustion engine, at least one first cylinder bank having activated gas exchange of at least one of the cylinders;
   an assigning arrangement to assign at least one second cylinder bank a separate intake tract; and
   an evaluating and measuring arrangement to measure a variable that is characteristic for a pressure in the intake tract of the at least one second cylinder bank in the at least one operating state, and to evaluate the variable with regard to a presence of undesired pressure pulsations.

2. A method for operating an internal combustion engine having a plurality of cylinder banks, the method comprising:
   initiating a deactivation of a gas exchange of all cylinders of at least one second cylinder bank in at least one operating state of the internal combustion engine, at least one first cylinder bank having activated gas exchange of at least one of the cylinders;
   assigning at least one second cylinder bank a separate intake tract;
   measuring a variable that is characteristic for a pressure in the intake tract of the at least one second cylinder bank in the at least one operating state; and
   evaluating the variable with regard to a presence of undesired pressure pulsations.

3. The method of claim 2, wherein a fault in the deactivation of the gas exchange is inferred if undesired pressure pulsations are present.

4. The method of claim 2, wherein, if undesired pressure pulsations having an amplitude above a predefined value fail to occur, a pressure derived from the measured characteristic variable is interpreted as a measure of the ambient pressure.

5. The method of claim 4, wherein the ambient pressure is determined by taking into consideration a pressure drop across a shared intake tract, the shared intake tract branching into the at least one first intake tract and the at least one second intake tract.

6. The method of claim 5, wherein the pressure drop across an air filter in the shared intake tract is taken into account in determining the ambient pressure.

7. The method of claim 5, wherein the pressure drop is determined as a function of a load and a rotational speed of the internal combustion engine.

8. The method of claim 2, wherein the measured variable characteristic for the pressure in the intake tract of the at least one second cylinder bank is sampled in a crankshaft-synchronous manner.

* * * * *